United States Patent
Bataller et al.

(10) Patent No.: US 9,555,544 B2
(45) Date of Patent: Jan. 31, 2017

(54) ROBOTIC PROCESS AUTOMATION

(71) Applicant: Accenture Global Solutions Limited, Dublin (IE)

(72) Inventors: Cyrille Bataller, Mougins (FR); Adrien Jacquot, Antibes Juan-les-Pins (FR); Sergio Raúl Torres, Den Haag (NL)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/094,063

(22) Filed: Apr. 8, 2016

(65) Prior Publication Data

US 2017/0001308 A1    Jan. 5, 2017

(30) Foreign Application Priority Data

Jul. 2, 2015 (EP) .................................... 15290172

(51) Int. Cl.
| | | |
|---|---|---|
| G05B 19/00 | (2006.01) | |
| B25J 9/16 | (2006.01) | |
| G06T 1/00 | (2006.01) | |
| G06F 3/0484 | (2013.01) | |

(52) U.S. Cl.
CPC ............. *B25J 9/163* (2013.01); *B25J 9/1697* (2013.01); *G06F 3/0484* (2013.01); *G06T 1/0014* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,825,394 A | * | 4/1989 | Beamish ................ | B25J 9/1697 356/147 |
| 7,565,607 B2 | * | 7/2009 | McGlinchey ......... | G06F 9/4446 715/709 |
| 8,095,237 B2 | * | 1/2012 | Habibi .................. | B25J 9/1692 29/702 |
| 8,330,811 B2 | * | 12/2012 | Macguire, Jr. .......... | G06F 3/011 345/632 |
| 8,330,812 B2 | * | 12/2012 | Maguire, Jr. ........... | G06F 3/011 345/679 |

(Continued)

OTHER PUBLICATIONS

Yeh et al., "Sikuli: Using GUI Screenshots for Search and Automation," UIST'09, Oct. 4-7, 2009, 11 pages.

*Primary Examiner* — Jonathan L Sample
(74) *Attorney, Agent, or Firm* — Fish & Richardson P.C.

(57) ABSTRACT

Methods, systems, and apparatus, including computer programs encoded on a computer storage medium, for automating a manual process. The methods, systems, and apparatus include actions of identifying a process that (i) is manually performed by a user interacting with a computer, and (ii) is to be automated for performance by a robot that is configured to interact with another computer. Additional actions include obtaining one or more images taken of a display of the computer while the user is interacting with the computer in manually performing the process and applying a computer vision technique to identify one or more activities associated with the process. Further actions include, for each of the one or more identified activities, generating activity information associated with the activity and generating a process definition for use in causing the robot to automatically perform the process.

20 Claims, 4 Drawing Sheets

(56) References Cited

U.S. PATENT DOCUMENTS

| | | | | |
|---|---|---|---|---|
| 8,559,699 B2* | 10/2013 | Boca | ............... | B25J 9/1679 382/153 |
| 8,793,578 B2* | 7/2014 | Mounty | ............... | G06F 11/3688 715/704 |
| RE45,062 E* | 8/2014 | Maguire, Jr. | ............... | G06F 3/011 345/8 |
| RE45,114 E* | 9/2014 | Maguire, Jr. | ............... | G06F 3/011 345/205 |
| 2001/0044661 A1* | 11/2001 | Kaji | ............... | G05B 13/0265 700/28 |
| 2004/0189675 A1* | 9/2004 | Pretlove | ............... | B25J 9/1656 345/633 |
| 2005/0069207 A1* | 3/2005 | Zakrzewski | ............... | B64D 45/0015 382/190 |
| 2006/0119572 A1* | 6/2006 | Lanier | ............... | G06F 1/1601 345/156 |
| 2007/0127101 A1* | 6/2007 | Oldroyd | ............... | G01C 11/00 359/24 |
| 2009/0037024 A1* | 2/2009 | Jamieson | ............... | G05B 19/0426 700/264 |
| 2010/0222957 A1* | 9/2010 | Ohta | ............... | B60K 35/00 701/31.4 |
| 2011/0015649 A1* | 1/2011 | Anvari | ............... | A61B 34/20 606/130 |
| 2011/0276396 A1* | 11/2011 | Rathod | ............... | G06F 17/30867 705/14.49 |
| 2012/0095619 A1* | 4/2012 | Pack | ............... | G05D 1/0038 701/2 |
| 2012/0197439 A1* | 8/2012 | Wang | ............... | B25J 9/1689 700/259 |
| 2013/0078600 A1* | 3/2013 | Fischer | ............... | G09B 19/00 434/236 |
| 2013/0178980 A1* | 7/2013 | Chemouny | ............... | B25J 9/1671 700/255 |
| 2013/0335405 A1* | 12/2013 | Scavezze | ............... | G06T 19/20 345/419 |
| 2013/0345875 A1* | 12/2013 | Brooks | ............... | B25J 9/0087 700/259 |
| 2014/0129942 A1* | 5/2014 | Rathod | ............... | H04N 21/44222 715/720 |
| 2014/0222023 A1* | 8/2014 | Kim | ............... | A61B 19/2203 606/130 |
| 2014/0369558 A1* | 12/2014 | Holz | ............... | G06K 9/00201 382/103 |
| 2014/0376777 A1* | 12/2014 | Churchill | ............... | G01C 21/26 382/104 |
| 2015/0096876 A1* | 4/2015 | Mittleman | ............... | H01H 11/00 200/341 |
| 2015/0287310 A1* | 10/2015 | Deliuliis | ............... | G08B 21/10 340/628 |
| 2016/0167226 A1* | 6/2016 | Schnittman | ............... | B25J 9/163 382/153 |

* cited by examiner

ROBOTIC PROCESS AUTOMATION

CROSS-REFERENCE TO RELATED APPLICATIONS

This application claims priority to European Patent Application No. EP15290172, filed Jul. 2, 2015, which is hereby incorporated by reference in its entirety.

TECHNICAL FIELD

This disclosure generally relates to robotic process automation.

BACKGROUND

Manual processes performed on a computer may be repetitive and time consuming. For example, a user may send e-mails in response to web form submissions, and for each web form submission, may need to manually interact with a computer to click buttons to open a window for composing a new e-mail, click buttons to copy information from the web form submission into the window, click keys to write text for a body of the e-mail, and click buttons to send the e-mail.

SUMMARY

In general, an aspect of the subject matter described in this specification may involve a process for automating a process that is manually performed by a person. To automate a manual process, a system may use computer vision techniques to analyze images of a display of a computer while a person is manually interacting with the computer while performing the process. From the analysis, the system may determine the activities associated with a process, e.g., keystrokes, mouse clicks, or touchscreen touches. Based on the determined activities, the system may then cause a robot to interact with a computer to automatically repeat the process. In repeating the process, the robot may also use computer vision techniques on images of a display of a computer to automatically perform interactions associated with the determined activities.

In some aspects, the subject matter described in this specification may be embodied in methods that may include the actions of identifying a process that (i) is manually performed by a user interacting with a computer, and (ii) is to be automated for performance by a robot that is configured to physically interact with the computer or another computer. Additional actions include obtaining one or more images taken of a display of the computer while the user is interacting with the computer in manually performing the process, applying a computer vision technique, to the images taken of the display of the computer while the user is interacting with the computer in manually performing the process, to identify one or more activities associated with the process. Further actions include, for each of the one or more identified activities, generating activity information associated with the activity and generating a process definition for use in causing the robot to automatically perform the process by physically interacting with the computer or the other computer, where the process definition indicates the one or more identified activities and, for each identified activity, indicates the activity information associated with the activity.

Other versions include corresponding systems, apparatus, and computer programs, configured to perform the actions of the methods, encoded on computer storage devices.

These and other versions may each optionally include one or more of the following features. For instance, in some implementations obtaining one or more images taken of a display of the computer while the user is interacting with the computer in manually performing the process includes obtaining the one or more images taken of the display of the computer from a camera. In some aspects, one or more images include a video. In certain aspects, generating activity information associated with the activity includes generating a snapshot of a portion of a screen shown on the display before the activity is performed. In some implementations, generating activity information associated with the activity includes generating a screenshot of a screen shown on the display after the activity is performed. In some implementations, the activities include one or more of a key press, a mouse click, a screen touch, a process in a foreground change, or a scene change.

In some aspects, the actions include accessing the process definition and automatically instructing the robot to physically interact with the computer or the other computer based on the activities and activity information indicated by the process definition. In certain aspects, automatically instructing the robot to interact with the computer or the other computer based on the activities and activity information indicated by the process definition includes identifying a portion of a screen shown on another display of the other computer that visually matches a snapshot indicated by the activity information for a particular activity and instructing the robot to physically touch the other display at a location corresponding to the center of the portion. In some implementations, automatically instructing the robot to interact with the other computer based on the activities and activity information indicated by the process definition includes determining that a screen shown on the other display corresponds to a screenshot indicated by the activity information for a particular activity and in response to determining that the screen shown on the other display corresponds to a screenshot indicated by the activity information for a particular activity, instructing the robot to physically interact with the other computer based on a subsequent activity indicated by the process definition. In some aspects, automatically instructing the robot to interact with the computer or the other computer based on the activities and activity information indicated by the process definition includes identifying a portion of a screen shown on another display of the other computer that visually matches a snapshot indicated by the activity information for a particular activity and instructing the robot to provide an electronic signal to the other computer to receive a click on coordinates corresponding to the center of the portion of the screen that visually matches the snapshot. In certain aspects, actions include generating a graphical version of the process definition that a person can use to modify the process.

One technical advantage may be that the system may enable more accurate automation. For example, different computers may have different screen resolutions, application window locations, application window sizes, or other differences that may cause problems when simply interacting based on stored coordinates for activities. Using computer vision techniques, the system may accurately determine when and where interactions should automatically occur even if buttons, controls, windows, or other user interface elements appear differently than when a manual process was performed. Additionally, computer vision techniques may enable the system to determine, based on images of a display, whether automatic interactions resulted in the successful completion of activities.

Other advantages may include that the system may enable automation on systems where only displayed information is readily available. For example, the system may not be in electronic communication with a computer used by a person to perform a manual process and the system may still be able to determine how to automatically perform the process. Another advantage may be that the system may enable processes to be automatically performed on systems that require physical interaction. For example, a computer may require physical inputs and a robot controlled by the system may perform the physical interactions. Yet another advantage may be that the system may be universal in that a robot is capable of interacting with a variety of user interfaces without the need for application-specific modules.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
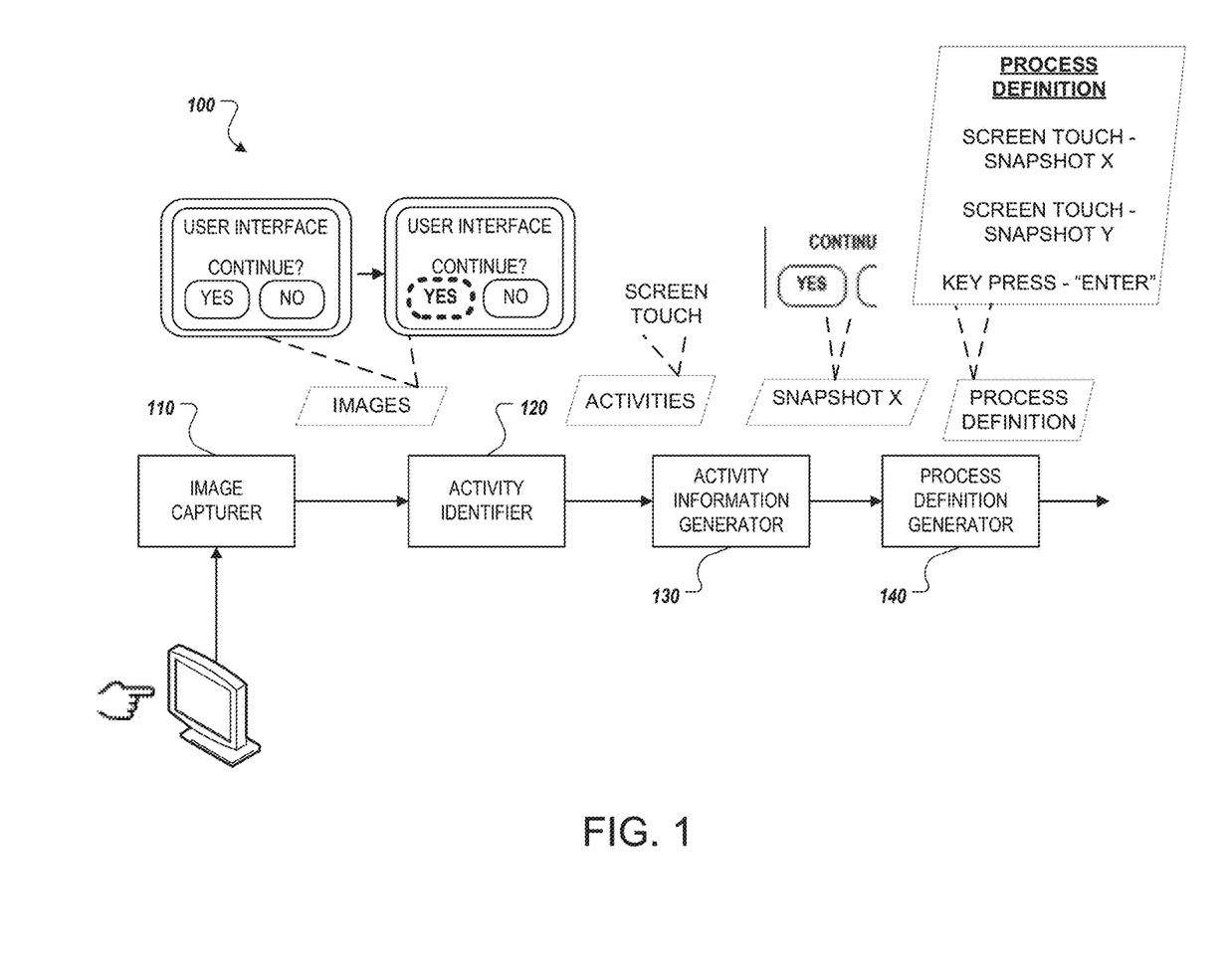
FIG. 1 is a block diagram of an example system for automating a manual process.

FIG. 1 is a block diagram of an example system 100 for automating a manual process. Briefly, and as described in further detail below, the system 100 may include an image capturer 110, an activity identifier 120, an activity information generator 130, and a process definition generator 140.

The image capturer 110 may obtain images of a display of a computer while a user is interacting with the computer in manually performing a process. For example, the image capturer may obtain a first image of a touchscreen showing a user interface with "Yes" and "No" buttons and a second image of a touchscreen showing the user interface with the "Yes" button being highlighted in response to being touched by the user. In some implementations, the image capturer 110 may be a camera, e.g., a charge-coupled device (CCD) camera or complementary metal-oxide-semiconductor (CMOS) camera, that captures images of a screen shown on the display. In other implementations, the image capturer 110 may be a software process running on the computer or on another computer that monitors video output from the computer to the display of the computer.

The image capturer 110 may begin obtaining images once the system 100 identifies a process that is (i) manually performed by a user interacting with a computer and (ii) is to be automated for performance by a robot that is configured to interact with the computer or another computer. For example, a user may open an application that automates manual processes, provide input that indicates that the user would like to automate a process for generating system status log entries, provide an input that indicates that the user is starting the manual process, and provide an input that indicates that the user has finished the manual process. In the example, the image capturer 110 may begin capturing images once the user provides an input that indicates that the user would like to automate a manual process and may stop capturing images once the user provides input that indicates that the user has finished the manual process. The image capturer 110 may obtain images at various times. For example, the image capturer 110 may obtain an image at predetermined intervals, e.g., every one, five, twenty five, one hundred milliseconds, or some other interval.

In another example, the image capturer 110 may be continuously obtaining images and the system 100 may use machine-learning to determine when a process begins and when a process ends. For example, a process splitter in the system 100 may use machine-learning to determine specific activities that are associated with a start or end of a process. Such activities may include a specific image being shown on a display, e.g., a specific software window popping into a foreground or a specific logo being detected. The process splitter may identify these specific activities, and split a list of sequential activities into different sub-lists of activities that contain all the events in between activities associated with starts and ends. In some implementations the process splitter may try to identify recurring sequences of activities, e.g., click on application icon, application window opens, and click on menu button, and when a recurring sequence of activities is identified, identify a first activity in the recurring sequence as an activity associated with a start of a process and identify a last activity in the recurring sequence as an activity associated with an end of a process.

The image capturer 110 may provide the obtained images to the activity identifier 120. For example, the image capturer 110 may obtain and provide the activity identifier 120 a first image of a touchscreen showing a user interface with "Yes" and "No" buttons and a second image of a touchscreen showing the user interface with the "Yes" button being highlighted in response to being touched.

The activity identifier 120 may apply computer vision techniques to the images received from the image capturer 110 to identify one or more activities associated with the process. For example, the activity identifier 120 may apply computer vision techniques to a first image of a touchscreen showing a user interface with "Yes" and "No" buttons and a second image of a touchscreen showing the user interface with the "Yes" button being highlighted in response to being touched and determine that an activity associated with the process is a screen touch. Other activities may include, for example, a mouse click, a key press, or a scene change.

Computer vision techniques may include identifying differences between images, performing optical character recognition, performing object recognition, or other techniques. For example, the activity identifier 120 may determine that based on the difference between the first image where the "Yes" and "No" buttons are not highlighted and the second image where the "Yes" button is highlighted, the "Yes" button was touched on a touchscreen. In another example, the activity identifier 120 may determine that in a first image a mouse cursor is over a menu icon that opens a menu and that in a second image the mouse cursor is still over the menu icon and that the menu is now open, and in response, determine that the menu icon was left mouse button clicked.

In yet another example, the activity identifier 120 may determine that a first image shows a user interface waiting for text input in a blank text field and a second image shows the user interface showing a letter in the text field, and in response, determine that the key corresponding to the letter was pressed. In still another example, the activity identifier 120 may determine that a difference between a first image and a second image shown on a display is changed more than a predetermined amount, e.g., 30%, 40%, 75%, 90%, or some other percentage, and in response, determine that a scene change occurred. In a further example, the activity identifier 120 may receive an image of a dark screen, e.g., a desktop background, then receive an image of light screen, e.g., after a new application window which has a white graphical user interface is opened, generating scores for each pixel based on comparing the intensity between the two scenes pixel by pixel, average the scores, determine that the averaged score is more than a predetermined threshold and, in response, determine a scene change has occurred. In a further example, the activity identifier 120 may determine that a blinking text cursor does not appear in a text field and then appears in a text field indicating that a left mouse click occurred on the text field. In yet a further example, the activity identifier 120 may identify a change in a process in a foreground based on one or more of a change in a graphical user interface window shown or a change in optical character recognized letters in a title bar of a graphical user interface window.

In some implementations, the activity identifier 120 may additionally identify activities using inputs besides the images. For example, the activity identifier 120 may receive keyboard inputs from a keyboard driver of the computer and in response identify an activity of a key press, or receive mouse inputs from a mouse driver of the computer and in response identify an activity of a mouse click. Other inputs may include indications, from a task manager of the computer, of one or more processes currently running or a current foreground process. The activity identifier 120 may provide the identified activity to the activity information generator 130. For example, the activity identifier 120 may provide an indication of the activity "Screen Touch" to the activity information generator 130.

The activity information generator 130 may generate activity information associated with the activity. Activity information may be information that describes the activity. For example, the activity information for a screen touch may describe the coordinates for a touch on a touch screen, a snapshot, e.g., a twenty pixel by twenty pixel area, fifty pixel by fifty pixel area, or some other size area, centered around the coordinates that are touched right before the touch screen was touched, and a screenshot of the display after the touch screen was touched. In some implementations, the activity information generator 130 may generate snapshots using intelligent cropping that may automatically determine an optimal size of a snapshot. For example, the activity information generator 130 may determine that a logo for a program on a taskbar has been selected and, in response, identify just the portion of the taskbar that corresponds to the logo and generate a snapshot including just the identified portion of the taskbar. In some implementations, a snapshot represents a portion, e.g., 10%, 20%, 30%, or some other percentage, of what's shown on a display that may be, for example, used to locate a control element within what's displayed and a screenshot represents substantially an entirety, e.g., 100%, 90%, 80%, or some other percentage, of what's shown on the display that may be, for example, used to determine whether a particular screen of a program is displayed.

In another example, the activity information for a key press may describe what key was pressed, a screenshot of a display before the key was pressed, and a screenshot of the display after the key was pressed. In yet another example, the activity information for a mouse click may describe what button of a mouse was clicked, the coordinates of the mouse cursor when the mouse was clicked, a snapshot centered around the coordinates of the mouse cursor right before the mouse was clicked, and a screenshot of the display after the mouse is clicked. In still another example, the activity information for a scene change may describe how long it took for the scene change to complete and a screenshot after the scene change was completed.

In some implementations, the activity information generator 130 may additionally identify activities based on keyboard inputs from a keyboard driver of the computer and in response generate activity information that indicates keys are pressed corresponding to the keyboard inputs, or receive mouse inputs from a mouse driver of the computer and in response generate activity information that indicates a button of a mouse that was clicked and current coordinates of a mouse cursor.

In some implementations, the activity information generator 130 may identify activities based on handling special characters. For example, the activity information generator 130 may determine that an uppercase letter "A" has been entered by a user based on an uppercase letter "A" appearing in a text input field shown on a display, determine that generating an uppercase letter "A" involves holding a "Shift" key, pressing the "A" key, and releasing the "Shift" key or pressing the "Caps Lock" key, pressing the "A" key, and then pressing the "Caps Lock" key again, and in response, identify activities of pressing those corresponding keys.

The activity information generator 130 may provide the activity information to the process definition generator 140. For example, the activity information generator 130 may provide the process definition generator 140 activity information for a screen touch activity that includes a snapshot showing a portion of a screen before the screen was touched centered around a "Yes" button. In other examples, the activity information generator 130 may provide the process definition generator 140 activity information for a key press activity that describes the "Enter" key was pressed and a screenshot right after the key was pressed. In yet another example, the activity information generator 130 may provide the process definition generator 140 activity information for a mouse click activity that describes that the "Left" mouse button was clicked in the upper right corner of the screen, a snap shot of the portion of the screen shown on the display right before the click centered around the upper right corner of the screen, and a screenshot of the screen shown on the display after the button was clicked. Other examples of activity information may include mouse wheel scrolling or other interactions with a mouse, a keyboard, a touchscreen, or another input device.

The process definition generator 140 may generate a process definition for use in causing a robot to automatically perform a process by interacting with another computer. For example, the process definition generator 140 may generate a process definition that indicates, among other things, that a robot should first touch a screen at a location corresponding to the center of a first snapshot centered around a "Yes" button, next touch a screen at a location corresponding to the center of a second snapshot centered around a "Determine current status" button, and next press the "Enter" key. Additional details of a how a robot may automatically perform a process according to a process definition are described below in relation to FIG. 2.

The process definition may indicate the one or more identified activities and, for each identified activity, indicate the activity information associated with the activity. For example, for a process of generating a log entry for a current system status, the process definition generator 140 may receive activity information that indicates a screen touch activity is associated with (i) a snapshot showing a portion of a screen before the screen was touched centered around a "Yes" button before the button is touched and (ii) a screenshot after the "Yes" button was touched, activity information that indicates a mouse click activity is associated with (i) the "Left" mouse button clicked in the upper right corner of the screen, (ii) a snap shot of the portion of the screen shown on the display right before the click centered around the upper right corner of the screen, and (iii) a screenshot of the screen shown on the display after the button was clicked, and activity information that indicates that a key press activity is associated with (i) an "Enter" key being pressed and (ii) a screenshot right after the key was pressed. The process definition may indicate the sequence for the one or more identified activities. For example, the process definition may indicate that a screen touch is first performed, then another screen touch, and then a key press.

The activity identifier 120, the activity information generator 130, and the process definition generator 140 may perform their respective functionality at various times. For example, the activity identifier 120 may store the images received from the image capturer 110 and wait until receiving an indication that a process is finished before applying computer vision techniques to the images to identify activities, the activity information generator 130 may then receive indications of all the activities at once and generate the activity information for all the activities, and the process definition generator 140 may receive indications of all the identities and indications of all the activity information at once, and then generate the process definition. In another example, the activity identifier 120 may provide an indication of each activity to the activity information generator 130 when the activity identifier 120 identifies the activity, the activity information generator 130 may generate the activity information for each activity as the indications of activities are received, and the process definition generator 140 may incrementally generate the process definition as the indications of activity information are received.

In some implementations, the system 100 process definition may be output as a document in a human-readable format including text describing the identified activities and text or images corresponding to the activity information. According to one example, a screenshot may be superimposed with or enclose the activity information in a human-readable format, e.g. natural text language, in a Word or Visio document. For instance, a screenshot showing the mouse pointer on a button may be modified to contain also a written instruction describing the step performed at the moment in which the screenshot was taken, such as "Left Click" to indicate a click with the left key of the mouse. In some implementations, system 100 may automatically and seamlessly collect information on different processes. For example, documentation operations carried out by the system 100 can also enable the system 100 to detect process anomalies or discrepancies between users, and make sure the final documentation created illustrates the optimal way of executing a process.

In some implementations, the system 100 may enable a person to modify the process definition. For example, the system 100 may provide a graphical user interface through which a user may add, remove, or modify activities and associated activity information indicated by the process definition, and store the modified process definition for later use in automatically performing a process defined by the modified process definition.

In some implementations, the system 100 may modify a process definition using a filter or a group of filters. For example, the system 100 may use a filter to create human readable representations of keystrokes, e.g., pressing a "Caps Lock" key, the "A" key, and the "Caps Lock" key can be instead represented by "Add input of 'A'." In another example, the system 100 can use a filter that masks sensitive information so that the information is not revealed during replay. For example, the system 100 may display a password with asterisks instead of the actual characters in the password.

Different configurations of the system 100 may be used where functionality of the image capturer 110, the activity identifier 120, the activity information generator 130, and the process definition generator 140 may be combined, further separated, distributed, or interchanged.

Figure 2:
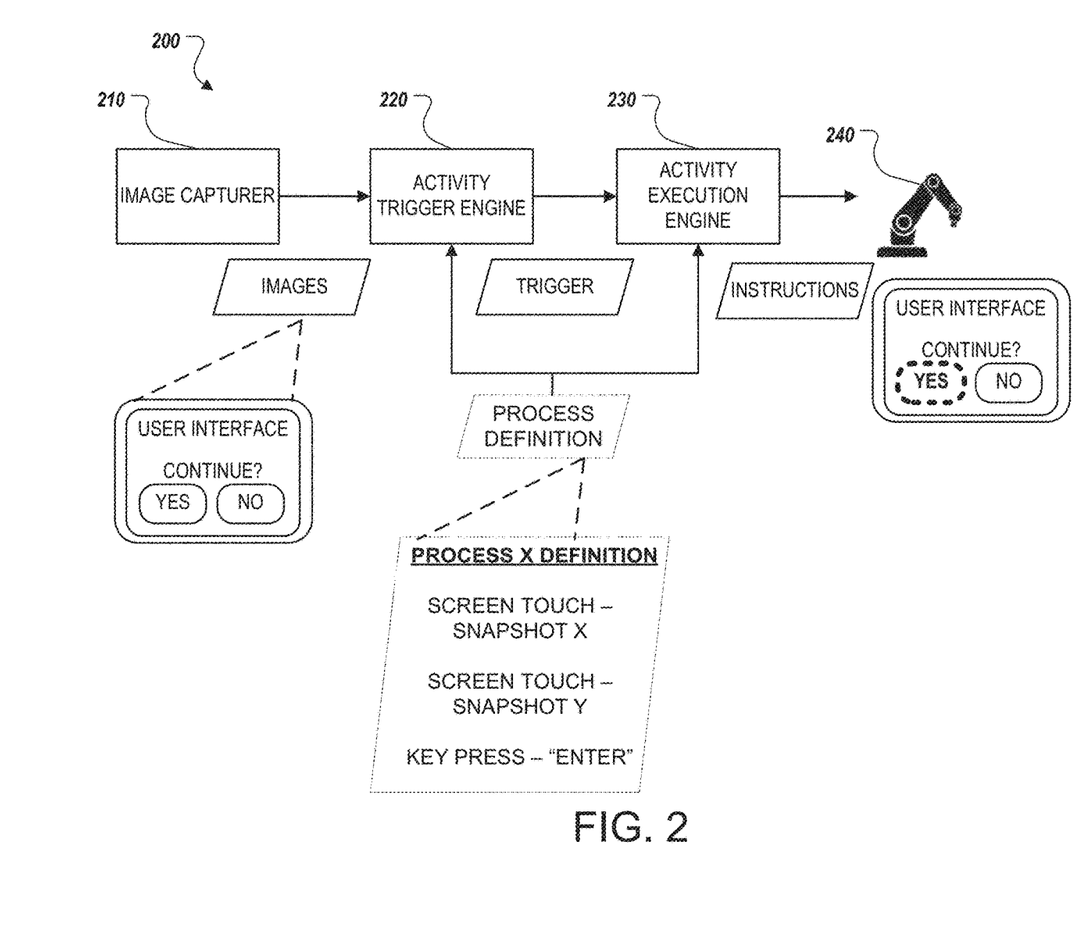
FIG. 2 is a block diagram of an example system for automatically performing a process.

FIG. 2 is a block diagram of an example system 200 for automatically performing an automating a process. The system 200 may automatically perform the process using a robot that interacts with a computer. Briefly, and as described in further detail below, the system 200 may include an image capturer 210, an activity trigger engine 220, an activity execution engine 230, and a robot 240.

The image capturer 210 may obtain images of a display of the computer while a robot is automatically performing the process by interacting with the computer. For example, the image capturer 210 may obtain a first image of a touchscreen showing a user interface with "Yes" and "No" buttons. In another example, the image capturer 210 may obtain a second image of a touchscreen showing the user interface with the "Yes" button being highlighted in response to being touched by the robot.

In some implementations, the image capturer 210 may be a camera that captures images of a screen shown on the display. In other implementations, the image capturer 210 may be a software process that monitors video output from the computer to the display of the computer.

The image capturer 210 may begin obtaining images once the system 200 identifies a process to be automatically performed by the robot according to a process definition. For example, a user may open an application that automatically performs processes according to process definitions, select a process definition for an automated process, and provide input that triggers the automated process to be performed. In the example, the image capturer 210 may begin capturing images once the user provides the input that triggers the automated process to be performed and stop capturing images once all the activities indicated by the process definition for the automated process have been executed. The image capturer 110 may obtain images at various times. For example, the image capturer 110 may obtain an image at predetermined intervals, e.g., every one, five, twenty five, one hundred milliseconds.

The image capturer 210 may provide the images to the activity trigger engine 220. For example, the image capturer 210 may provide a first image of a touchscreen showing a user interface with "Yes" and "No" buttons and a second image of a touchscreen showing the user interface with the "Yes" button being highlighted in response to the robot touching the "Yes" button.

The activity trigger engine 220 may receive the images and a process definition, and determine when to trigger an activity. For example, the activity trigger engine 220 may receive an image of a touchscreen showing a user interface with "Yes" and "No" buttons, receive a process definition that indicates that a first activity is a screen touch and indicates associated activity information including a snapshot of a screen displayed right before a user manually touched the "Yes" button and centered around the "Yes" button, e.g., "Snapshot X," and in response, determine to trigger a screen touch on the "Yes" button.

The activity trigger engine 220 may trigger the activities in order according to the process definition. For example, the activity trigger engine 220 may first analyze the images for portions that match Snapshot X for a first activity and then analyze the images for portions that match Snapshot Y for a second activity after the first activity is completed. The activity trigger engine 220 may trigger an activity when conditions for triggering the activity are satisfied. For example, the conditions may be when a portion of an image of a display matches a snapshot associated with the activity or that a previous activity is completed.

The activity trigger engine 220 may provide triggers to the activity execution engine 230. For example, the activity trigger engine 220 may provide a trigger that indicates that a screen touch is to be performed, a key press is to be performed, a mouse click is to be performed, or a scene change is expected.

The activity execution engine 230 may execute activities. For example, the activity execution engine 230 may provide instructions to the robot 240, where the robot 240 is a virtual robot, to virtually emulate moving a mouse cursor over a "Yes" button and a "Left" button click on the "Yes" button, e.g., through a mouse driver of the computer. In yet another example, the activity execution engine 230 may instruct a virtual robot to virtually emulate a press of an "Enter" key, e.g., through a keyboard driver of the computer. In another example, the activity execution engine 230 may provide instructions to the robot 240, where the robot 240 is a physical robot, to move an arm of a robot to touch a "Yes" button shown on a display. In another example, the activity execution engine 230 may determine to wait until a scene change is completed before proceeding to a next activity. In yet another example, the activity execution engine 230 may provide instructions to the robot 240 to move a mouse so that the cursor is over a particular button shown on a display and then click a "Left" button on the mouse.

The activity execution engine 230 may generate instructions for the robot 240 based on visually determining a relationship between the robot 240 and what is shown on a display. In some implementations, in executing an activity the activity execution engine 230 may use images from the image capturer 210. For example, to provide the robot 240 an instruction to touch a "Yes" button, the activity execution engine 230 may determine a location of a physical screen touch widget of the robot 240 based on applying object recognition for the physical screen touch widget to the images and a location of a "Yes" button on the display, determine movement of the physical screen touch widget of the robot 240 that would cause the physical screen touch widget to touch the "Yes" button in the images, generate movements instructions for the robot 240 corresponding to the determined movements, and provide the movement instructions to the robot 240.

In another example, the activity execution engine 230 may determine to press the "Enter" key and in response, analyze an image that shows a current location of a key press widget of the robot 240 and a current location of the "Enter" key on a keyboard, determine the current location of the key press widget of the robot 240 using object recognition in the image, determine the current location of the "Enter" key on a keyboard, determine movement of the key press widget of the robot 240 that would cause the key press widget of the robot 240 to press the "Enter" key, generate movement instructions for the robot 240 corresponding to the determined movements, and provide the movement instructions to the robot 240.

In yet another example, the activity execution engine 230 may determine to left click a mouse button over a "Yes" button shown on the display, and in response, determine from an image that the robot 240 is holding the mouse, determine from the image a location of a mouse cursor on the display, determine from the image a location of the "Yes" button shown on the display, determine an amount to move the mouse based on a distance between mouse cursor and the "Yes" button shown on the display, generate movement instructions for the robot 240 to move the mouse cursor the determined amount, and provide the instructions to the robot 240.

In some implementations, in generating the instructions for the robot 240 the activity execution engine 230 may identify the robot 240, determine movement capabilities of the robot, determine movements for the robot 240 to make based on the movement capabilities of the robot and a relative distance to close between the robot 240 and an input device of a computer, determine a format of movement instructions that the robot 240 understands, and generate movement instructions in the determined format based on the determined movements for the robot 240.

The activity execution engine 230 may execute the activities based on the process definition. For example, the process definition for a screen touch activity may include a snapshot of an area centered on a "Yes" button and a screenshot showing a screen after the "Yes" button is clicked. Accordingly, in executing the screen touch activity according to the process definition, the activity execution engine 230 may determine where the "Yes" button is shown on a display, provide one or more instructions to the robot 240 to touch the "Yes" button, and then determine whether a screen shown on the display matches the screenshot indicated by the process definition. If the screen does not match, the activity execution engine 230 may provide a notification to an administrator or send the instructions to the robot 240 again. If the screen does match, the activity execution engine 230 may then provide an indication, to the activity trigger engine 220, that the activity trigger engine 220 may begin determining whether conditions for triggering an activity indicated by the process definition as subsequent to the activity just performed are satisfied.

In another example, the activity execution engine 230 may determine that a scene change is expected based on the process definition, and in response, determine whether a screen shown on a display has changed by a predetermined amount corresponding to a scene change, e.g., 30%, 40%, 75%, 90%, or some other percentage, from an image of the screen before the activity was triggered. If a scene change has not occurred, the activity execution engine 230 may repeat the instructions to the robot or may provide a notification to an administrator.

In some implementations, the activity execution engine 230 may additionally execute activities based on a combination of stored coordinates and snapshots. For example, the process definition may indicate a mouse click at coordinates corresponding to the center of a screen and a snapshot centered on a "Yes" button, but the activity execution engine 230 may determine that the center of the snap shot corresponds to a coordinates that are fifty pixels to the left of the center of the screen currently displayed. In response, the activity execution engine 230 may modify the coordinates, e.g., average the coordinates and determine to click on coordinates that are twenty five pixels to the left of the center of the screen. In some implementations, the activity execution engine 230 may first use coordinates according to a screen shown on a display without regard to stored coordinates, if the activity is not successfully completed as described above, use the modified, e.g., averaged coordinates, if the activity is still not completed, use the stored coordinates, and if the activity is still not completed, provide a notification to an administrator.

Figure 3:
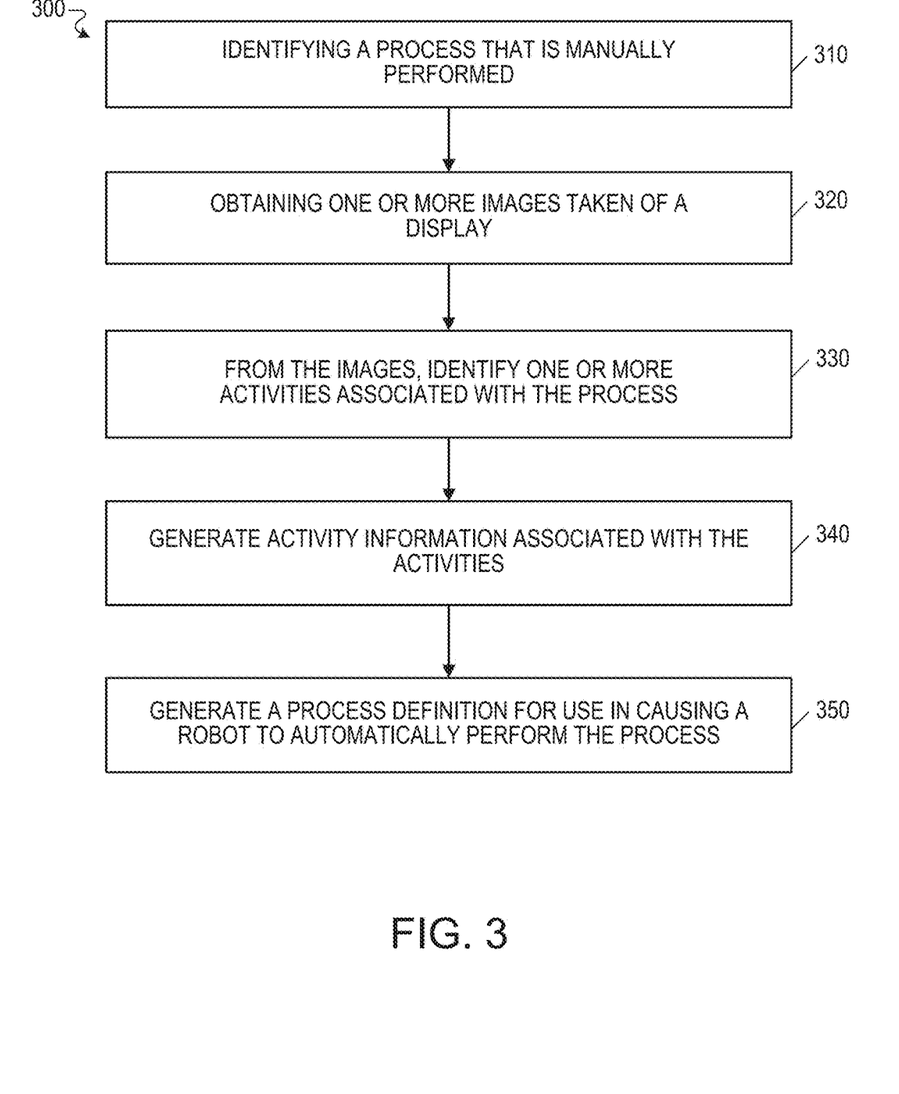
FIG. 3 is a flowchart of an example process for automating a manual process.

FIG. 3 is a flowchart of an example process 300 for automating a manual process. The following describes the processing 300 as being performed by components of the systems 100 and 200 that are described with reference to FIGS. 1 and 2. However, the process 300 may be performed by other systems or system configurations.

The process 300 may include identifying a process that is manually performed (310). The process may be manually performed by a user interacting with a computer, and to be automated for performance by a robot that is configured to interact with a computer. For example, the process that is manually performed may be generating a template e-mail in response to web form submissions. In identifying the process, a user may provide user input that indicates that the user would like to automate a particular manual process and that the user is beginning to perform the particular manual process.

The process 300 may include obtaining one or more images taken of a display (320). The images may be taken while the user is interacting with the computer in manually performing the process. For example, the image capturer 110 may receive an indication that a user is beginning a manual process to be automated by a robot and in response begin capturing an image of a display of the computer every five, ten, twenty five, one hundred milliseconds, or at some other interval. The images may include a first image showing a mouse cursor above a "New e-mail" button, a second image showing the "New email" button highlighted in a different color in response to a left mouse click, and a third image showing a "New email" window open.

The process 300 may include, from the images, identifying one or more activities associated with the process (330). The activities may be identified by applying one or more computer vision techniques to the images. For example, the activity identifier 120 may determine that the first image showing a mouse cursor above a "New e-mail" button and a next second image showing the "New email" button highlighted means that a "Left" click occurred on the "New email" button and, in response, identify the activity of a mouse click.

The process 300 may include generating activity information associated with the activities (340). For example, the activity information generator 130 may receive the indication of the activity of mouse click and the images, and in response, generate activity information that includes coordinates where the mouse click occurred, a snapshot of a thirty by thirty pixel area around the "New e-mail" button before the "New e-mail" button was clicked, and a screenshot after the "New e-mail" button was clicked.

The process 300 may include generating a process definition for use in causing a robot to automatically perform the process (350). The process definition may indicate the one or more identified activities and, for each identified activity, indicate the activity information associated with the activity. For example, the process definition generator 140 may generate information in XML, HTML, C#, XAML, or other some other format that indicates that a process for generating a template e-mail in response to web form submissions includes a first activity of "Left" mouse clicking a "New email" button associated with (i) coordinates at the top middle of the screen, (ii) a snapshot of the "New email" button before the button is clicked, and (iii) a screenshot of the button of the "New email" button showing that the button becomes highlighted after the click, a second activity of a scene change associated with (i) a screenshot before the scene change begins before the "New email" window opens and (ii) a screenshot after the scene change finishes when the "New email" window is open, and additional other activities, e.g., opening a log of web form submissions, copying a subject for a web form submission, selecting a subject line in the new e-mail window, and pasting the copied subject for the web submission into the subject line.

The process 300 may include storing the process definition and later accessing the process definition and automatically instructing the robot to interact with a computer based on the activities and activity information indicated by the process definition. For example, a user may request that a robot automatically perform the process for generating a template e-mail in response to web form submissions, and in response, the image capturer 210 may begin obtaining images of a display of a computer, the activity trigger engine 220 may determine when an image includes a portion that matches a snapshot associated with a first activity of "Left" clicking a "New e-mail" button indicated by the process definition, and the activity execution engine may instruct the robot 240 to move a physical robot arm to move a mouse until a mouse cursor is above the "New e-mail" button and click the "Left" button.

The process definitions may be inspected by a developer or a business analyst, which may be a human being or a computer, e.g. in order to choose an optimized process definition for a particular process among a plurality of process definitions that are the result of generating multiple process definitions for the same process different machines or users. For example, different process definitions may be inspected for similarities using technologies such as machine learning to recognize and group similar procedures into a categorization system. Once a selection has been made, the selected process definition may be used for automatically performing the process.

Figure 4:
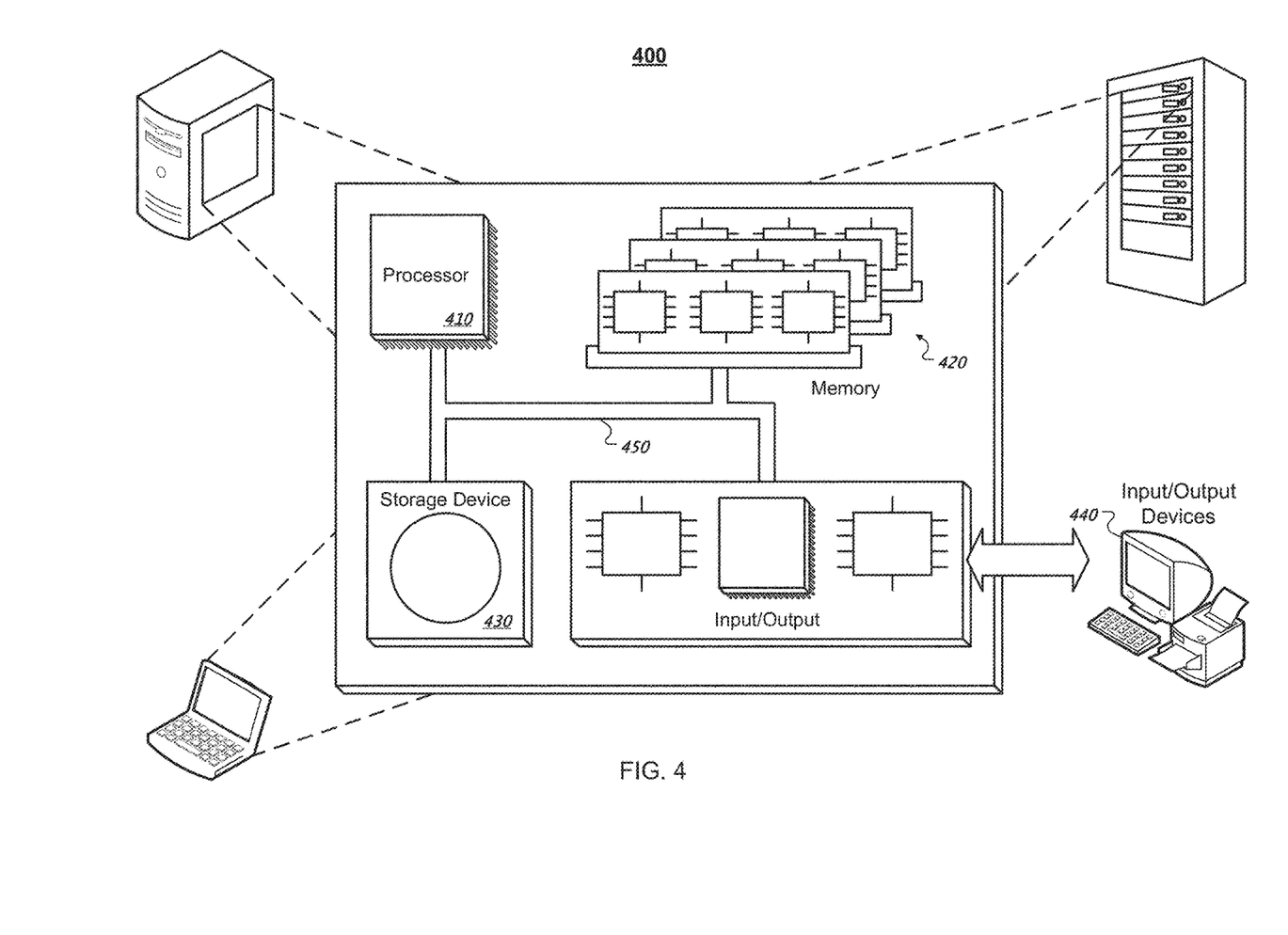
FIG. 4 illustrates a schematic diagram of an exemplary generic computer system.

FIG. 4 illustrates a schematic diagram of an exemplary generic computer system. The system 400 can be used for the operations described in association with the processes 300 according to some implementations. The system 400 may be included in the system 100.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
   identifying a process that (i) is manually performed by a user interacting with a computer, and (ii) is to be automated for performance by a robot that is configured to interact with the computer or another computer;
   obtaining images taken of a display of the computer while the user is interacting with the computer in manually performing the process;
   applying a computer vision technique, to the images taken of the display of the computer while the user is interacting with the computer in manually performing the process, to determine that a change in images taken of the display of the computer while the user is interacting with the computer in manually performing the process satisfies a predetermined threshold corresponding to a scene change;
   in response to determining that the change in images taken of the display of the computer while the user is interacting with the computer in manually performing the process satisfies the predetermined threshold corresponding to a scene change, identifying a first activity corresponding to receipt of input from the user during the process followed by a second activity corresponding to a scene change during the process;
   for each of the identified activities, generating activity information associated with the activity;
   generating a process definition for use in causing the robot to automatically perform the process by interacting with the computer or the other computer, where the process definition indicates the first activity corresponding to receipt of the input from the user followed by the second activity corresponding to the scene change and, for each indicated activity, indicates the activity information associated with the activity; and
   storing the process definition for later use in causing the robot to automatically perform the process by interacting with the computer or the other computer.

2. The method of claim 1, wherein obtaining images taken of a display of the computer while the user is interacting with the computer in manually performing the process comprises:
   obtaining images taken of the display of the computer from a camera.

3. The method of claim 1, wherein the one or more images comprise a video.

4. The method of claim 1, wherein generating activity information associated with the activity comprises:
   generating a snapshot of a portion of a screen shown on the display before the activity is performed.

5. The method of claim 1, wherein generating activity information associated with the activity comprises:
   generating a screenshot of a screen shown on the display after the activity is performed.

6. The method of claim 1, wherein the activities comprise two or more of a key press, a mouse click, a screen touch, a process in a foreground change, or a scene change.

7. The method of claim 1, comprising:
   accessing the process definition; and
   automatically instructing the robot to physically interact with the computer or the other computer based on the activities and activity information indicated by the process definition.

8. The method of claim 7, wherein automatically instructing the robot to interact with the computer or the other computer based on the activities and activity information indicated by the process definition comprises:
   identifying a portion of a screen shown on another display of the other computer that visually matches a snapshot indicated by the activity information for a particular activity; and
   instructing the robot to physically touch the other display at a location corresponding to the center of the portion.

9. The method of claim 7, wherein automatically instructing the robot to interact with the other computer based on the activities and activity information indicated by the process definition comprises:
   determining that a screen shown on the other display corresponds to a screenshot indicated by the activity information for a particular activity; and
   in response to determining that the screen shown on the other display corresponds to a screenshot indicated by the activity information for a particular activity, instructing the robot to physically interact with the other computer based on a subsequent activity indicated by the process definition.

10. The method of claim 7, wherein automatically instructing the robot to interact with the computer or the other computer based on the activities and activity information indicated by the process definition comprises:
- identifying a portion of a screen shown on another display of the other computer that visually matches a snapshot indicated by the activity information for a particular activity; and
- instructing the robot to provide an electronic signal to the other computer to receive a click on coordinates corresponding to the center of the portion of the screen that visually matches the snapshot.

11. The method of claim 1, comprising:
generating a graphical version of the process definition that a person can use to modify the process.

12. A system comprising:
- one or more computers and one or more storage devices storing instructions that are operable, when executed by the one or more computers, to cause the one or more computers to perform operations comprising:
- identifying a process that (i) is manually performed by a user interacting with a computer, and (ii) is to be automated for performance by a robot that is configured to interact with the computer or another computer;
- obtaining images taken of a display of the computer while the user is interacting with the computer in manually performing the process;
- applying a computer vision technique, to the images taken of the display of the computer while the user is interacting with the computer in manually performing the process, to determine that a change in images taken of the display of the computer while the user is interacting with the computer in manually performing the process satisfies a predetermined threshold corresponding to a scene change;
- in response to determining that the change in images taken of the display of the computer while the user is interacting with the computer in manually performing the process satisfies the predetermined threshold corresponding to a scene change, identifying a first activity corresponding to receipt of input from the user during the process followed by a second activity corresponding to a scene change during the process;
- for each of the identified activities, generating activity information associated with the activity;
- generating a process definition for use in causing the robot to automatically perform the process by interacting with the computer or the other computer, where the process definition indicates the first activity corresponding to receipt of the input from the user followed by the second activity corresponding to the scene change and, for each indicated activity, indicates the activity information associated with the activity; and
- storing the process definition for later use in causing the robot to automatically perform the process by interacting with the computer or the other computer.

13. The system of claim 12, wherein obtaining images taken of a display of the computer while the user is interacting with the computer in manually performing the process comprises:
obtaining images taken of the display of the computer from a camera.

14. The system of claim 12, wherein the one or more images comprise a video.

15. The system of claim 12, wherein generating activity information associated with the activity comprises:
generating a snapshot of a portion of a screen shown on the display before the activity is performed.

16. The system of claim 12, wherein generating activity information associated with the activity comprises:
generating a screenshot of a screen shown on the display after the activity is performed.

17. The system of claim 12, wherein the activities comprise tow or more of a key press, a mouse click, a screen touch, a process in a foreground change, or a scene change.

18. The system of claim 12, comprising:
- accessing the process definition; and
- automatically instructing the robot to physically interact with the computer or the other computer based on the activities and activity information indicated by the process definition.

19. The system of claim 18, wherein automatically instructing the robot to interact with the computer or the other computer based on the activities and activity information indicated by the process definition comprises:
- identifying a portion of a screen shown on another display of the other computer that visually matches a snapshot indicated by the activity information for a particular activity; and
- instructing the robot to physically touch the other display at a location corresponding to the center of the portion.

20. A non-transitory computer-readable medium storing software comprising instructions executable by one or more computers which, upon such execution, cause the one or more computers to perform operations comprising:
- identifying a process that (i) is manually performed by a user interacting with a computer, and (ii) is to be automated for performance by a robot that is configured to interact with the computer or another computer;
- obtaining images taken of a display of the computer while the user is interacting with the computer in manually performing the process;
- applying a computer vision technique, to the images taken of the display of the computer while the user is interacting with the computer in manually performing the process, to determine that a change in images taken of the display of the computer while the user is interacting with the computer in manually performing the process satisfies a predetermined threshold corresponding to a scene change;
- in response to determining that the change in images taken of the display of the computer, while the user is interacting with the computer in manually performing the process satisfies the redetermined threshold cones corresponding to a scene change, identifying a first activity corresponding to receipt of input from the user during the process followed by a second activity corresponding to a scene change during the process;
- for each of the identified activities, generating activity information associated with the activity;
- generating a process definition for use in causing the robot to automatically perform the process by interacting with the computer or the other computer, where the process definition indicates the first activity corresponding to receipt of the input from the user followed by the second activity corresponding to the scene change and, for each indicated activity, indicates the activity information associated with the activity; and
- storing the process definition for later use in causing the robot to automatically perform the process by interacting with the computer or the other computer.

* * * * *

UNITED STATES PATENT AND TRADEMARK OFFICE
CERTIFICATE OF CORRECTION

PATENT NO. : 9,555,544 B2
APPLICATION NO. : 15/094063
DATED : January 31, 2017
INVENTOR(S) : Cyrille Bataller, Adrien Jacquot and Sergio Raúl Duarte Torres It is certified that error appears in the above-identified patent and that said Letters Patent is hereby corrected as shown below:

In the Claims

In Claim 17, Column 18, Line 8, delete "tow" and insert -- two --, therefor.

In Claim 20, Column 18, Line 46, delete "computer," and insert -- computer --, therefor.

In Claim 20, Column 18, Line 48, delete "redetermined" and insert -- predetermined --, therefor.

In Claim 20, Column 18, Line 48, after "threshold" delete "cones".

Signed and Sealed this
Twenty-first Day of March, 2017

Michelle K. Lee
*Director of the United States Patent and Trademark Office*